(12) United States Patent
Vercruysse (10) Patent No.: US 12,470,050 B2
(45) Date of Patent: Nov. 11, 2025

(54) CABLE ENTRY FOR WATER-TIGHT AND DUST-TIGHT LEAD- THROUGH OF A CABLE, HOUSING WITH CABLE ENTRY, AND METHOD OF LEADING A CABLE THROUGH A CABLE ENTRY

(71) Applicant: 1Enclose bv, Ghent (BE)

(72) Inventor: Philip Vercruysse, Ghent (BE)

(73) Assignee: 1Enclose bv, Ghent (BE)

( * ) Notice: Subject to any disclaimer, the term of this patent is extended or adjusted under 35 U.S.C. 154(b) by 190 days.

(21) Appl. No.: 18/553,825

(22) PCT Filed: Apr. 6, 2022

(86) PCT No.: PCT/IB2022/053202
§ 371 (c)(1),
(2) Date: Oct. 3, 2023

(87) PCT Pub. No.: WO2022/214989
PCT Pub. Date: Oct. 13, 2022

(65) Prior Publication Data
US 2024/0195158 A1    Jun. 13, 2024

(30) Foreign Application Priority Data
Apr. 7, 2021 (BE) .................................. 2021/5268

(51) Int. Cl.
*H02G 3/08* (2006.01)
*H02G 1/06* (2006.01)
(Continued)

(52) U.S. Cl.
CPC ............... *H02G 3/088* (2013.01); *H02G 1/06* (2013.01)

(58) Field of Classification Search
CPC ........ H02G 3/088; H02G 3/22; H02G 15/007; H02G 15/013; H02G 1/06
See application file for complete search history.

(56) References Cited

U.S. PATENT DOCUMENTS

2018/0138681 A1    5/2018   Naumann et al.

FOREIGN PATENT DOCUMENTS

| CN | 2594553 Y | 12/2003 |
|---|---|---|
| CN | 203081332 U | 7/2013 |

(Continued)

OTHER PUBLICATIONS

ISR-WO dated Jul. 1, 2022 for parent application PCT/IB2022/053202.

*Primary Examiner* — Timothy J Thompson
*Assistant Examiner* — Amol H Patel
(74) *Attorney, Agent, or Firm* — Vorys, Sater, Seymour and Pease LLP (57) ABSTRACT

The present invention relates to a cable entry comprising a body, wherein the body extends along a longitudinal axis and comprises a cavity, a first and a second opening for passage of the cable, a sealing element, wherein the sealing element is received in the hollow body and comprises a cylindrical channel for passage of the cable, wherein the cylindrical channel is oriented along the longitudinal axis, and a clamping element on the side of the second opening for clamping the sealing element, wherein the body and the clamping element each comprise two detachable halves, a first half on a first side and a second half being located on a second side of a plane, wherein the longitudinal axis of the body is in the plane, and wherein the sealing element is spiral shaped. The invention also relates to a housing, a method, and a use.

16 Claims, 2 Drawing Sheets

(51) Int. Cl.
*H02G 3/22* (2006.01)
*H02G 15/007* (2006.01)
*H02G 15/013* (2006.01)

(56) References Cited

FOREIGN PATENT DOCUMENTS

| | | |
|---|---|---|
| CN | 205315339 U | 6/2016 |
| DE | 29518214 U1 | 1/1996 |
| DE | 202004018347 U1 | 1/2005 |
| WO | 2022/214989 A1 | 10/2022 |

CABLE ENTRY FOR WATER-TIGHT AND DUST-TIGHT LEAD- THROUGH OF A CABLE, HOUSING WITH CABLE ENTRY, AND METHOD OF LEADING A CABLE THROUGH A CABLE ENTRY

TECHNICAL FIELD

The invention relates to a cable entry, in particular a cable entry for watertight and dust-tight lead-through of a cable, for instance in a housing, and a method of leading a cable through a cable entry.

PRIOR ART

In the landscape of cable connections in telecom and energy systems, many possibilities are available for connecting cables in junction boxes, switch boxes and the like. These junction boxes and switch boxes can be placed both indoors and outdoors. In certain cases, for example, junction boxes are even placed underground. It is essential that such junction boxes and switch boxes are perfectly watertight and dust-tight to prevent water, dust, or in the case of underground junction boxes, soil, or mud, for example, from penetrating into the junction boxes or switch boxes. This can have a very negative effect on the quality of branches or connections in these junction boxes, which in the long term can lead to loss of quality in telecom and electricity systems or to interruptions, for example due to short circuits.

A critical point here are the cable entries. Numerous solutions have been devised and applied for this in the past. An example of this is a classic cable gland with a rubber sealing ring that is fitted over the cable and pressed against the cable by tightening a nut in the gland.

Another known cable entry is described in EP 2 617 112. EP '112 describes a modular connector for cables or pipes. The modular connector comprises concentric peelable layers. Depending on the diameter of the cable or pipe, none or more of the layers are peeled off, until a correct diameter is obtained for the passage of the cable or pipe.

Other examples of modular connectors for cables are known from DE 20 2004 018 347, US 2018/0138681 and DE 295 18 214.

Yet another known solution for avoiding water and dust ingress into, for example, a junction box, is completely filling the junction box with a resin or a two-component liquid.

Also known are the use of thermoplastic materials such as shrink sleeves or vulcanized rubber, which are melted around a cable entry and a cable to make them watertight and dust tight.

These known solutions have significant drawbacks or problems. When using a gland it is necessary to cut the cable in order to pass the cable through the gland and the rubber sealing ring. This means that it is not possible, for example, to fit a junction box around an existing cable to make a new branch, without temporarily interrupting a communication or energy system. In addition, all conductors in the cable have to be reconnected after cutting, which is a time-consuming job and involves a high risk of errors and poor connections. Moreover, a cable gland is not suitable for underground connections because the rubber sealing ring cannot withstand, for example, high water pressure, which means that groundwater, water and/or mud can penetrate into a junction box. In addition, the rubber sealing ring hardens over time, gradually reducing the effectiveness of the watertight and dust-tight lead-through.

A modular connector according to EP '112 is suitable for feeding through a cable without cutting the cable, because the modular connector consists of two halves. A disadvantage of this cable entry is that it is necessary to estimate how many layers have to be peeled off for the passage of a cable. If a layer is peeled off too many, it is possible that visually a modular connector according to EP '112 appears to join correctly, but locally has small cracks, which are not visible to the eye. As a result, such a modular connector is again unusable for underground cable entries, because water, earth and/or mud are forced through these cracks at high water pressure. Again there is the problem of aging, which makes water and dust ingress progressively worse.

For example, filling a junction box with a resin or two-component liquid is an effective solution, but has the major drawback that, for example to make additional branches on the cable, the solidified resin or the two-component liquid has to be cut from the junction box, which leads to a high risk of damage to the cable.

Thermoplastic materials harden over time, making a cable entry no longer watertight and dust tight.

The present invention aims to solve at least some of the above problems or drawbacks.

SUMMARY OF THE INVENTION

In a first aspect, the present invention relates to a cable entry according to claim 1.

The great advantage of such a cable entry is that the sealing element is spiral-shaped and that the body and the clamping element each comprise two detachable halves. As a result a cable passed through a cable entry according to the present invention does not require the cable to first be cut. The sealing element is spirally wound around the cable, whereby the cable is inserted into the channel of the sealing element. The two halves of the body are closed around the sealing element and the two halves of the clamping element are closed around the cable, after which the sealing element is clamped by the clamping element in the cavity of the body. The sealing element presses against both the cable and the body of the cable entry, resulting in a watertight and dust-tight cable entry. It is also advantageous that through the use of a spiral-shaped sealing element, several successive contiguous sealing rings are formed around the cable, whereby a cable entry according to the present invention can withstand high water pressures and is therefore particularly advantageous for underground use. It is also advantageous that if the sealing element on a side in contact with the environment ages, there are sufficient successive contiguous rings to continue to guarantee watertightness and dust-tightness.

Preferred embodiments of the device are set out in claims 2-9.

This preferred embodiment is particularly advantageous because both the cavity and the sealing element are conical. When clamping the sealing element in the cavity of the body, the sealing element is pressed towards the apex angle and evenly compressed by the body against the cable. This guarantees a watertight and dust-tight cable entry, even with slightly deviating cable diameters.

In a second aspect, the invention relates to a housing comprising at least one cable entry according to the first aspect. The main advantage of a housing according to the present invention is that the housing comprises a box in two halves, in which a first half of the body of each cable entry is integrated in a first half of the box and a second half of the body of the cable entry is clamped against the first half of the body of the cable entry by a second half of the box. As a result, additional watertight and dust-tight seals between the cable entry and the box of the housing are unnecessary, such as when using a cable gland, and a seal of the box is sufficient to obtain a guaranteed watertight and dust-tight housing. An additional advantage is that a cable does not have to be cut in order to place a housing over the cable.

This method has the advantage, among other things, that a cable does not have to be cut for the passage of a cable through a cable entry. The sealing element can be wound spirally around the cable and the body of the cable entry can be opened into two halves and closed around the sealing element. The clamping element can also be opened into two halves and closed around the cable. After fixing the clamping element in or on the cable entry, the sealing element is clamped in the cavity of the body and the cable is fed watertight and dust-tight through the cable entry. The use of a spiral-shaped element is also advantageous because as a result several successive contiguous sealing rings are formed around the cable, whereby a cable entry formed according to the present invention can withstand high water pressures and is therefore particularly advantageous for underground use.

This use results in an advantageous branching of cables in telecom or energy systems because cables do not have to be cut and the telecom or energy system does not have to be interrupted. The junction box can be fitted around the cable with an already installed cable, after which an additional branch can be made. By using the cable entry, the junction box remains watertight and dust-tight for a very long period, even when used underground, and can easily be opened again, for example for repairs or additional branches.

DETAILED DESCRIPTION

Unless otherwise defined, all terms used in the description of the invention, including technical and scientific terms, have the meaning as commonly understood by a person skilled in the art to which the invention pertains. For a better understanding of the description of the invention, the following terms are explained explicitly.

In this document, "a" and "the" refer to both the singular and the plural, unless the context presupposes otherwise. For example, "a segment" means one or more segments.

The terms "comprise", "comprising", "consist of", "consisting of", "provided with", "include", "including", "contain", "containing", are synonyms and are inclusive or open terms that indicate the presence of what follows, and which do not exclude or prevent the presence of other components, characteristics, elements, members, steps, as known from or disclosed in the prior art.

Quoting numerical intervals by endpoints comprises all integers, fractions and/or real numbers between the endpoints, these endpoints included.

In a first aspect, the invention relates to a cable entry for watertight and dust-tight lead-through of a cable in a housing.

According to a preferred embodiment, the cable entry comprises a body, a sealing element, and a clamping element.

The body extends along a longitudinal axis. The body is preferably manufactured from a plastic. The body comprises a cavity and a first and second opening for passage of the cable. The first and second openings are positioned on opposite sides of the cavity on the longitudinal axis of the body. The first and second openings are preferably located in parallel planes. Thus, a cable is passed along the longitudinal axis of the body through the first opening, the cavity and the second cavity through the cable entry. The diameter of the first and the second opening are at least equal to or greater than the diameter of the cable.

The sealing element is received in the cavity of the body. The sealing element is made of a flexible material, such as for instance a rubber. Preferably, the sealing element is made of a synthetic flexible material. This is advantageous in order to avoid or at least delay aging of the sealing element through contact with, for instance, water, air, sun, and the like. A non-limiting example of a suitable material is styrene butadiene rubber or other suitable synthetic rubber. The sealing element extends along the longitudinal axis of the body. The sealing element comprises a cylindrical channel for passage of the cable. The cylindrical channel is oriented along the longitudinal axis of the body. At rest, before receiving in the cavity of the body and before passage of a cable in the duct, the sealing element has a length along the longitudinal axis that is at least greater than a distance along the longitudinal axis between the first opening and the second opening in the cavity.

The clamping element is suitable for clamping the sealing element in the cavity of the body. The clamping element is placed on the side of the second opening. The clamping element can be detachably mounted in or on the cable entry. For example, the clamping element can be clicked into or onto the cable entry. For example, the clamping element can be screwed into or onto the cable entry. The clamping element can be fixed in or on the cable entry, for example by means of screws or bolts. Since the sealing element at rest has a length along the longitudinal axis which is at least greater than the distance between the first and the second opening, the sealing element is compressed in the cavity of the body after clamping by the clamping element, whereby the sealing element is clamped against walls of the cavity and around the cable and seals the cable entry watertight and dust tight.

The body and the clamping element each comprise two detachable halves. The two halves of the body can, but need not be, equal. The two halves of the clamping element can, but need not be, equal. A first half of the body is on a first side and a second half is on a second side of a plane, the longitudinal axis of the body being in the plane. A first half of the clamping element is on a first side and a second half is on a second side of a plane, the longitudinal axis of the body being in the plane. The planes along which the halves of the body and the clamping element lie can, but need not be, equal. The halves of the body can preferably be clicked together or can be fastened to each other by means of screws or bolts. Alternatively, the halves of the body are clamped together. The halves of the clamping element can preferably be clicked together or can be fastened to each other by means of screws or bolts. Alternatively, the halves of the clamping element are clamped together. The sealing element is spiral shaped.

This embodiment is advantageous because a cable can be fed through the cable entry without cutting the cable. Because the sealing element is spiral-shaped, the sealing element can be wound spirally around the cable without cutting the cable, whereby the cable is introduced into the channel of the sealing element. An additional advantage is that the sealing element is suitable for a wide range of cable diameters, without the need to update or trim the sealing element.

By detaching the two halves of the body, the body can be closed around the sealing element without cutting the cable, after which the sealing element is received in the cavity of the body. By detaching the two halves of the clamping element, the clamping element can be closed around the cable without cutting the cable. By fixing the clamping element in or on the cable entry, the sealing element is clamped in the cavity of the body.

It is also advantageous that through the use of a spiral-shaped sealing element, several successive contiguous sealing rings are formed around the cable, whereby a cable entry according to the present invention can withstand high water pressures and is therefore particularly advantageous for underground use. It is also advantageous that if the sealing element on a side in contact with the environment ages, there are sufficient successive contiguous rings to continue to guarantee watertightness and dust-tightness.

When clamping the sealing element in the cavity of the body by the clamping element in a direction along the longitudinal axis of the body, the sealing element will be compressed in the longitudinal axis direction and expand in a direction transverse to the longitudinal axis, wherein the channel possibly first widens, until the sealing element presses against walls of the cavity, after which the channel is also pressed closed upon further compression. It is therefore possible that the channel does not completely join to the cable everywhere. It is therefore particularly advantageous that due to the spiral shape of the sealing element, successive loops of the spiral-shaped sealing element will twist and shift relative to each other during compression, so that the channel contained in the sealing element will immediately be constricted, while at the same time the sealing element will compress against walls of the cavity. This is similar to a snake coiling around prey. This guarantees a watertight and dust-tight cable entry over the entire length of the sealing element.

Another advantage of a cable entry according to the present invention is that it can easily be opened and closed again after installation and replaced, if necessary, without having to cut cables or break connections.

According to one embodiment, the length of the sealing element along the longitudinal axis at rest is at least 5% longer than the distance along the longitudinal axis between the first and the second opening, preferably at least 7.5% longer, more preferably at least 10%, even more preferably at least 12.5% longer and even more preferably at least 15% longer. This is advantageous because as a result the sealing element is sufficiently compressible in the direction of the longitudinal axis by the clamping in the cavity to obtain a guaranteed watertight and dust-tight cable entry.

According to one embodiment, the cavity and the sealing element have a conformed cross-section in planes transverse to the longitudinal axis. Cross-sections of the sealing element at rest are on a scale of at least 0.95:1 with respect to the cross-sections of the cavity in the body, the cross-sections of the sealing element and of the cavity being at the same position along the longitudinal axis with respect to the first opening. Preferably, the cross-sections of the sealing element are on a scale of at least 0.96:1, more preferably on a scale of at least 0.97:1, even more preferably on a scale of at least 0.98:1 and even more preferably on a scale of at least 0.99:1. This is advantageous because as a result the sealing element can be easily received in the cavity and, after clamping by the clamping element in the cavity, quickly press against walls of the cavity and thereby compress and clamp around the cable in order to obtain a watertight and dust-tight lead-through.

According to a further embodiment, the cross-sections of the cavity and the sealing element are rotationally symmetrical with respect to the longitudinal axis of the body. This is advantageous because as a result, irrespective of an orientation of the sealing element relative to the cavity, the sealing element can always be received in the cavity, so that assembly of the cable entry is simple.

According to a preferred embodiment, the cavity and the sealing element are conical. The cavity and the sealing element have an equal apex angle. The apex angle is an apex angle of a cone that corresponds to the conical shape of the cavity and the sealing element. The apex angle of the cavity is positioned on the side of the first opening. The apex angle is at least 50, preferably at least 60 and more preferably at least 70.

This embodiment is particularly advantageous because when clamped by the clamping element of the sealing element in the cavity of the body, the sealing element is pressed from the side of the second opening in the direction of the apex angle on the side of the first opening and evenly compressed by the body against the cable. For example, with a cylindrical cavity, the sealing element would first press against walls of the cavity on the side of the first opening and be compressed and only later would be pressed against walls of the cavity further from the first opening and not as with a conically shaped cavity and sealing element immediately along the entire length of the sealing element. Even with slightly deviating cable diameters, a watertight and dust-tight cable entry is guaranteed, especially with small cable diameters compared to the diameter of the channel of the sealing element at rest, where otherwise the sealing element would possibly only be sufficiently compressed near the first opening to connect against the cable.

According to a preferred embodiment, the body comprises a strain relief on the side of the first opening. The strain relief comprises a pressure plate and two screws or bolts. The bolts or screws are preferably stainless metal screws or bolts. The body comprises two screw holes for receiving the two screws or bolts. The pressure plate can be attached to the cable by means of the two screws. The pressure plate is preferably a U-shape. Preferably, the strain relief comprises two U-shapes, wherein a first U-shape is the pressure plate, and a second U-shape is fixed to a first half of the body. Due to the strain relief, no tensile forces on the cable can be transmitted from the side of the second opening to possible branches on the cable on the side of the first opening. This is advantageous for robust branches. An additional advantage is that the cable is always positioned in the same direction with respect to the cable entry, so that the cable exerts no or limited torsional forces on the cable entry. Torsional forces can have a negative influence on the water-tightness and dust-tightness of a cable entry.

According to a preferred embodiment, the body comprises a strain relief on the side of the second opening. The strain relief on the side of the second opening is similar to the strain relief on the side of the first opening and has similar advantages. Both embodiments can be advantageously combined to obtain optimum strain relief.

According to a preferred embodiment, a washer is placed in the cavity of the body near the first opening. The washer is placed between the first opening and the sealing element. The washer comprises two halves. The two halves of the washer can, but need not be, equal. A first half of the washer is on a first side and a second half is on a second side of a plane, the longitudinal axis of the body being in the plane. The halves of the washer can preferably be clicked together. A washer comprising two halves is advantageous because the washer can be fitted without cutting the cable. The washer is advantageous as a pressure surface for the sealing element to prevent the sealing element from being pressed through the first opening.

According to one embodiment, a second washer is placed in the cavity of the body near the second opening. The second washer is positioned between the second opening and the sealing element. The second washer comprises two halves. The two halves of the second washer can, but need not be, equal. A first half of the second washer is on a first side and a second half is on a second side of a plane, the longitudinal axis of the body being in the plane. The halves of the second washer can preferably be clicked together. A second washer comprising two halves is advantageous because the washer can be fitted without cutting the cable. The second washer is advantageous as a pressure surface for the sealing element in order to prevent the sealing element from being damaged during clamping by means of the clamping element.

According to a preferred embodiment, the clamping element is a hollow bolt. The hollow bolt extends along a longitudinal axis. The hollow bolt comprises a channel for passage of the cable along the longitudinal axis. The channel extends from a first end of the bolt to a second end. The hollow bolt comprises a screw thread. A hollow bolt is advantageous for clamping the sealing element in the cavity of the body because, depending on the diameter of the cable, the hollow bolt can be screwed in less or more, whereby the hollow bolt presses the sealing element less or more against walls in the cavity and the channel is more or less constricted.

The hollow bolt preferably comprises recesses and/or teeth on edges along the longitudinal axis of the two halves of the hollow bolt. The recesses and/or teeth of a first half are complementary to the teeth and/or recesses of a second half. This is advantageous to ensure that a hollow bolt, after the hollow bolt has been closed around the cable, is correctly composed so that a screw thread on the hollow bolt is continuous. This is also advantageous to prevent the two halves from sliding relative to each other when the hollow bolt is tightened.

According to a further embodiment, the cable entry comprises on the side of the second opening symmetrically about the longitudinal axis of the body a cylindrical threaded inner wall configured to receive the hollow bolt. This means that the screw thread on the inner wall and the screw thread on the hollow bolt have at least the same pitch and that the diameter of the hollow bolt and the diameter of the cylindrical inner wall are matched to each other. The cylindrical threaded inner wall is advantageous for simple screwing in and out of the hollow bolt in the cable entry, wherein the hollow bolt is automatically aligned correctly with respect to the first opening. The cylindrical inner wall is preferably located outside the cavity. This is particularly advantageous in combination with a previously described embodiment in which the cavity and the sealing element have a conical shape, so that a hollow bolt can only be tightened to a very limited extent in the body, which can cause too limited compression of the sealing element and as a result of which a hollow bolt is not sufficiently firmly attached to the cable entry.

The cylindrical threaded inner wall is part of the body of the cable entry. Alternatively, the cylindrical threaded inner wall is part of the strain relief on the side of the second opening, as in a previously described embodiment. The screw thread is herein arranged partly on the first U-shape and partly on the second U-shape.

According to a preferred embodiment, a hollow cylindrical pressing means is placed inside the hollow bolt. The cylindrical pressing means is placed between the cable and the hollow bolt. The cylindrical pressing means comprises an annular pressure surface on the side of the second opening. The annular pressure surface is preferably placed in the cavity of the body. The cylindrical pressing means is movable along the longitudinal axis from the first opening in the direction of the second opening. By tightening the hollow bolt, the cylindrical pressing means is moved by the bolt from the first opening toward the second opening. The pressure surface hereby presses against the sealing element. The pressure surface is advantageous for avoiding damage to the sealing element by rotation of the hollow bolt. The pressure surface has a similar function to the previously described second sealing ring. An outer edge of the pressure surface has a diameter at least greater than a diameter of the screw thread of the hollow bolt. An outer edge of the pressure surface has a diameter which is preferably smaller than a cross section of the cavity of the body at the level of the second opening and transverse to the longitudinal axis. This is advantageous because as a result the pressure surface can be moved at least partially within the cavity along the longitudinal axis, in particular in combination with a previously described embodiment in which the cavity is conical. The cylindrical pressing means is also advantageous for protecting the cable from damage from rotation of the hollow bolt.

The hollow cylindrical pressing means preferably comprises recesses and/or teeth on edges along the longitudinal axis of the two halves of the hollow cylindrical pressing means. The recesses and/or teeth of a first half are complementary to the teeth and/or recesses of a second half. This is advantageous to ensure that a hollow cylindrical pressing means is correctly composed after the hollow cylindrical pressing means has been closed around the cable. This is also advantageous in order to prevent the two halves of the hollow cylindrical pressing means from sliding relative to each other when the hollow bolt is tightened.

In a second aspect, the invention relates to a housing with cable entry for watertight and dust-tight lead-through of at least one cable.

According to a preferred embodiment, the housing comprises at least one cable entry, preferably at least two cable entries, and a box. Each cable entry is according to the first aspect. The box is made of a waterproof material. The box comprises a free inner space. The box is preferably made of a corrosion-resistant material. The box comprises two detachable halves. A first half of the body of each cable entry is integrated into a first half of the box. A second half of the body of the cable entry is clamped against the first half of the body by a second half of the box. Optionally, the second half of the body of the cable entry is integrated into the second half of the box. One half of the body of each cable entry can be molded in a mold at the same time as one half of the box to integrate the respective half into the half of the box. One half of the body of each cable entry can be fused into one half of the box to integrate the respective half into the half of the box.

One half of a box comprises a contact surface. The contact area is the surface with which halves of the box are in contact with each other after closing the box. The contact area is a circumference of a cross-section of the box. The contact area comprises a groove along the circumference of said cross-section. The box preferably comprises a seal in said groove for a watertight and dust-tight closure of the box. The seal is, for example, a sealing rubber. Alternatively, one half of the box comprises a groove along the circumference of said cross-section and another half of the box comprises a complementary tongue along the circumference of said cross-section. Yet another embodiment is a combination of both, wherein the seal is compressed by the tongue in the groove. If the second half of the body is not integrated in the second half of the box, at least one seal is preferably used, the seal also being placed between the second half of the box and the second half of the body.

The main advantage of a housing according to the present invention is that the housing comprises a box in two halves, in which a first half of the body of each cable entry is integrated in a first half of the box and a second half of the body of the cable entry is clamped against the first half of the body of the cable entry by a second half of the box. As a result, additional watertight and dust-tight seals between the cable entry and the box of the housing are unnecessary, such as when using a cable gland, and a seal of the box is sufficient to obtain a guaranteed watertight and dust-tight housing. An additional advantage is that a cable does not have to be cut in order to place a housing over the cable.

Another advantage of a housing according to the present invention is that it can easily be opened and closed again after installation and replaced, if necessary, without having to cut cables or break connections.

According to a preferred embodiment, the first half of the box comprises a base plate. The base plate extends on a side wall of the box with a cable entry beyond the side wall, so beyond a volume of the box. Preferably, the base plate extends beyond the side wall, on each side wall with a cable entry. The base plate comprises a strain relief outside the box and in the longitudinal direction of cable entries on the said side wall.

The strain relief comprises a pressure plate and two screws or bolts. The base plate comprises two screw holes for receiving the two screws or bolts. The bolts or screws are preferably stainless metal screws or bolts. The pressure plate can be attached to the cable by means of the two screws or bolts. The pressure plate is preferably a U-shape. Preferably, the strain relief comprises two U-shapes, wherein a first U-shape is the pressure plate, and a second U-shape is fixed to the base plate. Due to the strain relief, no tensile forces on the cable can be transmitted from the side of the first opening to the cable entry. This is advantageous for a robust watertight and dust-tight cable entry. An additional advantage is that the cable is always positioned in the same direction with respect to the cable entry, so that the cable exerts no or limited torsional forces on the cable entry. Torsional forces can have a negative influence on the watertightness and dust-tightness of a cable entry. This embodiment is particularly advantageous for cables with a large diameter.

According to a preferred embodiment, the housing comprises at least two cable entries. The box comprises an elongate cylindrical projection on a side wall. The elongate cylindrical projection comprises a cylindrical channel for passage of cables. The channel extends from the box to a free end of the elongate cylindrical projection. The elongate cylindrical projection comprises two detachable halves. A first half of the elongate cylindrical projection is a part of the first half of the box and a second half of the elongate cylindrical projection is a part of the second half of the box. This is advantageous because it allows several cables to be fed through the channel without cutting the cables. Preferably, one cable entry is in the longitudinal direction of the elongate cylindrical projection, on an opposite side wall. If the plurality of cables have different diameters, the cable entry for the cable with the largest diameter is preferably in the longitudinal direction of the elongate cylindrical projection. This is advantageous because a cable with the largest diameter can be expected to be the least flexible, making it less easy to bend the cable from a cable entry to the elongate cylindrical projection.

This embodiment is advantageous for feeding several cables through one opening in, for instance, a second housing. The plurality of cables are each fed separately through a separate cable entry in the housing. The plurality of cables are fed together through the elongate cylindrical projection out of the housing. The elongate cylindrical projection is passed through a cable entry in the second housing, whereby the plurality of cables are simultaneously passed through the cable entry in the second housing. By using a watertight and dust-tight cable entry to feed the elongate cylindrical projection into the second housing, for example by using a cable entry according to the first aspect or a housing according to the second aspect, a plurality of cables are passed through a single cable entry watertight and dust-tight into a second housing. A housing according to the present embodiment is, as it were, a multi-cable insert for a single cable entry according to the first aspect.

In a third aspect, the invention relates to a method for passing a cable through a watertight and dust-tight cable entry.

In a preferred embodiment, the method comprises the steps of:

feeding a cable into a cylindrical channel in a sealing element of the cable entry;

receiving the sealing element in a cavity of a body of the cable entry, the body extending along a longitudinal axis, the cable being passed through a first and a second opening of the body, and wherein the first and second openings are positioned on the longitudinal axis of the body on opposite sides of the cavity;

clamping the sealing element in the cavity of the body using a clamping element.

The sealing element is spiral shaped. The sealing element is spirally wound around the cable. Because the sealing element is wound spirally around the cable, the sealing element can be wound around the cable without cutting the cable, whereby the cable is introduced into the channel of the sealing element. An additional advantage is that the sealing element is suitable for a wide range of cable diameters, without the need to update or trim the sealing element. It is also advantageous that by winding the sealing element spirally around the cable, several successive contiguous sealing rings are formed around the cable, whereby a cable entry according to the present invention can withstand high water pressures and is therefore particularly advantageous for underground use. It is also advantageous that if the sealing element on a side in contact with the environment ages, there are sufficient successive contiguous rings to continue to guarantee watertightness and dust-tightness.

The body is opened into two halves to receive the sealing element. Thereafter, the two halves are closed around the sealing element. By opening the body into two halves, the body can be closed around the sealing element without cutting the cable, after which the sealing element is received in the cavity of the body.

The clamping element is opened into two halves to clamp the sealing element. Then the two halves are closed around the cable and the clamping element is fixed in or on the cable entry. The clamping element is fixed in or on the cable entry in a direction along the longitudinal axis. By opening the clamping element into two halves, the clamping element can be closed around the cable without cutting the cable. By fixing the clamping element in or on the cable entry, the sealing element is clamped in the cavity of the body.

When clamping the sealing element in the cavity of the body by the clamping element in a direction along the longitudinal axis of the body, the sealing element will be compressed in the longitudinal axis direction and expand in a direction transverse to the longitudinal axis, wherein the channel possibly first widens, until the sealing element presses against walls of the cavity, after which the channel is also pressed closed upon further compression. It is therefore possible that the channel does not completely join to the cable everywhere. It is therefore particularly advantageous that by spirally winding the sealing element around the cable, successive loops of the sealing element will twist relative to each other during compression, so that the channel contained in the sealing element will immediately be constricted, while at the same time the sealing element will compress against walls of the cavity. This is similar to a snake coiling around prey. This guarantees a watertight and dust-tight cable entry over the entire length of the sealing element.

According to a preferred embodiment, the clamping element is a hollow bolt. The hollow bolt extends along a longitudinal axis. The hollow bolt comprises a channel for passage of the cable along the longitudinal axis of the body. The channel extends from a first end of the bolt to a second end. The hollow bolt comprises a screw thread. The hollow bolt is tightened in the cable entry. The hollow bolt compresses the sealing element during tightening. A hollow bolt is advantageous for clamping the sealing element in the cavity of the body because, depending on the diameter of the cable, the hollow bolt can be screwed in less or more, whereby the hollow bolt presses the sealing element less or more against walls in the cavity and the channel is more or less constricted.

According to a preferred embodiment, the method comprises the additional step of screwing in a strain relief. The strain relief is comprised in the cable entry. The strain relief comprises a pressure plate and two screws or bolts. The bolts or screws are preferably stainless metal screws or bolts. The body comprises two screw holes for receiving the two screws or bolts. The pressure plate is attached to the cable by means of the two screws or bolts. The pressure plate is preferably a U-shape. Preferably, the strain relief comprises two U-shapes, wherein a first U-shape is the pressure plate, and a second U-shape is fixed to the cable entry. Preferably, two strain reliefs are screwed on, a first strain relief on the side of the first opening and a second strain relief on the side of the second opening. Due to the strain relief, no tensile forces on the cable can be transmitted to possible branches on the cable. This is advantageous for robust branches. An additional advantage is that the cable is always positioned in the same direction with respect to the cable entry, so that the cable exerts no or limited torsional forces on the cable entry. Torsional forces can have a negative influence on the watertightness and dust-tightness of a cable entry.

According to a preferred embodiment, the cable is not cut when being passed through the cable entry. This is advantageous because it means that a telecom or energy system does not have to be interrupted to run a cable through a cable entry.

One skilled in the art will appreciate that a cable entry according to the first aspect is preferably configured to perform a method according to the third aspect and that a method according to the third aspect is preferably performed using a cable entry according to the first aspect. Each feature described in this document, both above and below, can therefore relate to any of the four aspects of the present invention.

In a fourth aspect, the invention relates to a use of a housing according to the second aspect or a method according to the third aspect for placing junction boxes in telecom or energy systems.

This use results in an advantageous branching of cables in telecom or energy systems because cables do not have to be cut and the telecom or energy system does not have to be interrupted. The junction box can be fitted around the cable with an already installed cable, after which an additional branch can be made. By using the cable entry, the junction box remains watertight and dust-tight for a very long period, even when used underground, and can easily be opened again, for example for repairs or additional branches.

In what follows, the invention is described by way of non-limiting figures illustrating the invention, and which are not intended to and should not be interpreted as limiting the scope of the invention.

DETAILED DESCRIPTION OF THE FIGURES

Figure 1:
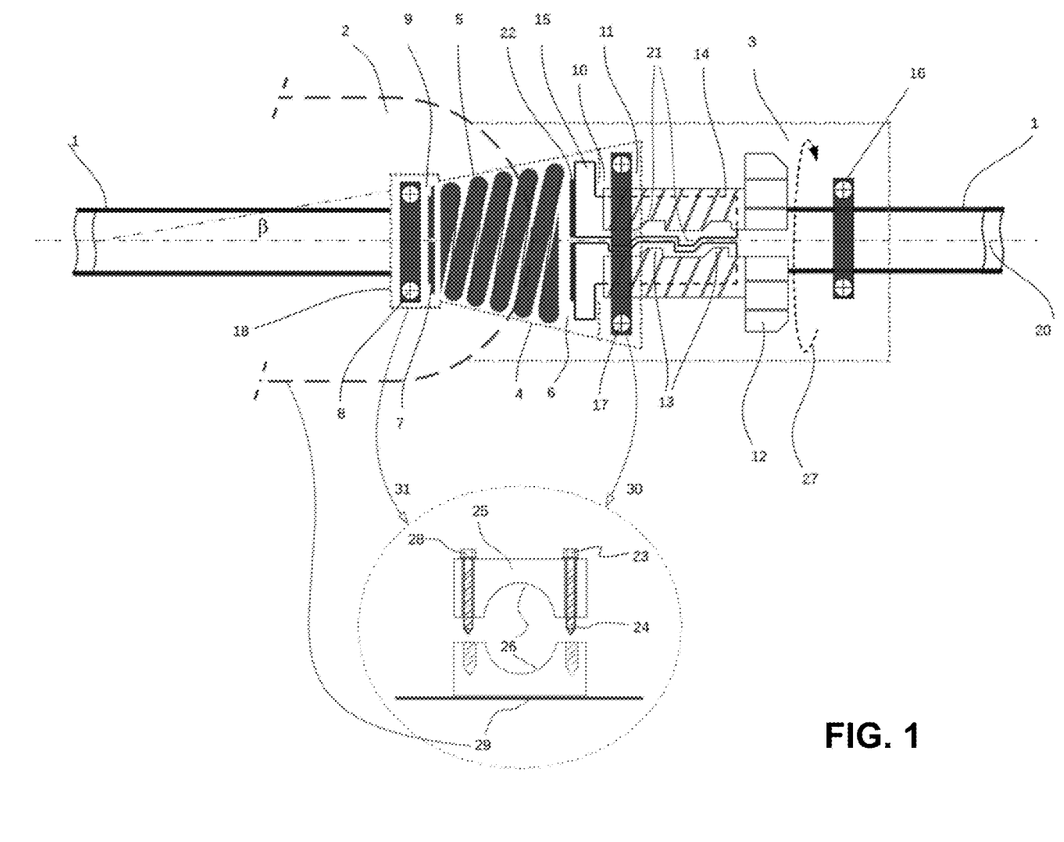
FIG. 1 shows a cross-sectional view of a housing according to an embodiment of the present invention.

FIG. 1 shows a cross-sectional view of a housing according to an embodiment of the present invention.

A cable (1) is fed through a cable entry (18) in a housing (2). Only part of the housing (2) is shown in FIG. 1. The cable entry (18) is integrated in the housing (2). The cable entry (18) comprises a body (4), a sealing element (5) and a clamping element (12). The body (4) extends along a longitudinal axis (20). The body (4) comprises a cavity (6), a first opening (9) and a second opening (10). The first opening (9) and the second opening (10) are positioned on the longitudinal axis (20) on opposite sides of the cavity (6). The sealing element (5) is received in the cavity (6). The sealing element (5) is spiral-shaped and wound around the cable (1). The cavity (6) and the sealing element (5) are conical, the cavity (6) and the sealing element (5) having an equal apex angle (0). The body (4) and the clamping element (12) comprise two halves. A first half of the body (4) is integrated in a first half of the housing (2). A second half of the body (4) is clamped against the first half of the body (4) by a second half of the housing (2). The cable entry (18) comprises two strain reliefs (8) and (17). The strain reliefs (8) and (17) are shown in detail in (31) and (30) respectively. The strain reliefs (8) and (17) comprise two metal stainless bolts (24), comprising a first bolt (23) and a second bolt (28), a first U-shape (25) and a second U-shape (29). The second U-shape (29) is attached to the first half of the body (4). The first U-shape (25) is attached to the second U-shape (29) by means of the first bolt (23) and the second bolt (28). A first washer (7) is placed in the cavity (6) near the first opening (9). The first washer (7) comprises two detachable halves. The clamping element (12) is a hollow bolt (12). The hollow bolt (12) has recesses and/or teeth (13) on edges along the longitudinal axis (20) of the two halves of the hollow bolt (12). On the side of the second opening (10), the cable entry (18) comprises a cylindrical inner wall (11) with screw thread symmetrically around the longitudinal axis (20) for tightening the hollow bolt (12) in the cable entry (18). In this embodiment, the cylindrical inner wall (11) is comprised in the strain relief (17). The threaded cylindrical inner wall (11) is indicated on the detail (30) as threaded cylindrical inner wall (26) and is part of the first U-shape (25) and part of the second U-shape (29). The detail (31) of the strain relief (8) also has a cylindrical inner wall, but without screw thread. The dashed line with arrow (27) indicates the direction of rotation for tightening the hollow bolt (12) in the cable entry (18). Inside the hollow bolt (12) a hollow cylindrical pressing means (14) is placed. The cable (1) runs through the hollow cylindrical pressing means (14). The hollow cylindrical pressing means (14) has an annular pressure surface (15) on the side of the second opening (10) and recesses and/or teeth (21) on edges along the longitudinal axis (20) of the two halves of the hollow cylindrical pressing means (14). A second washer (22) is placed in the cavity (6) near the second opening (10). The second washer (22) comprises two detachable halves. The second washer (22) is placed against the annular pressure surface (15) of the hollow cylindrical pressing means (14) and is adapted to evenly distribute the pressing force exerted by the hollow cylindrical pressing means (14) on the sealing element (5). If the cable has a large diameter, large tensile and bending forces arise and an additional strain relief must be installed. To this end, the housing (2) comprises an optional base plate (3). The base plate (3) extends beyond a side wall with the cable entry (18). The base plate (3) comprises a strain relief (16) in the longitudinal direction of the cable entry (18).

Figure 2:
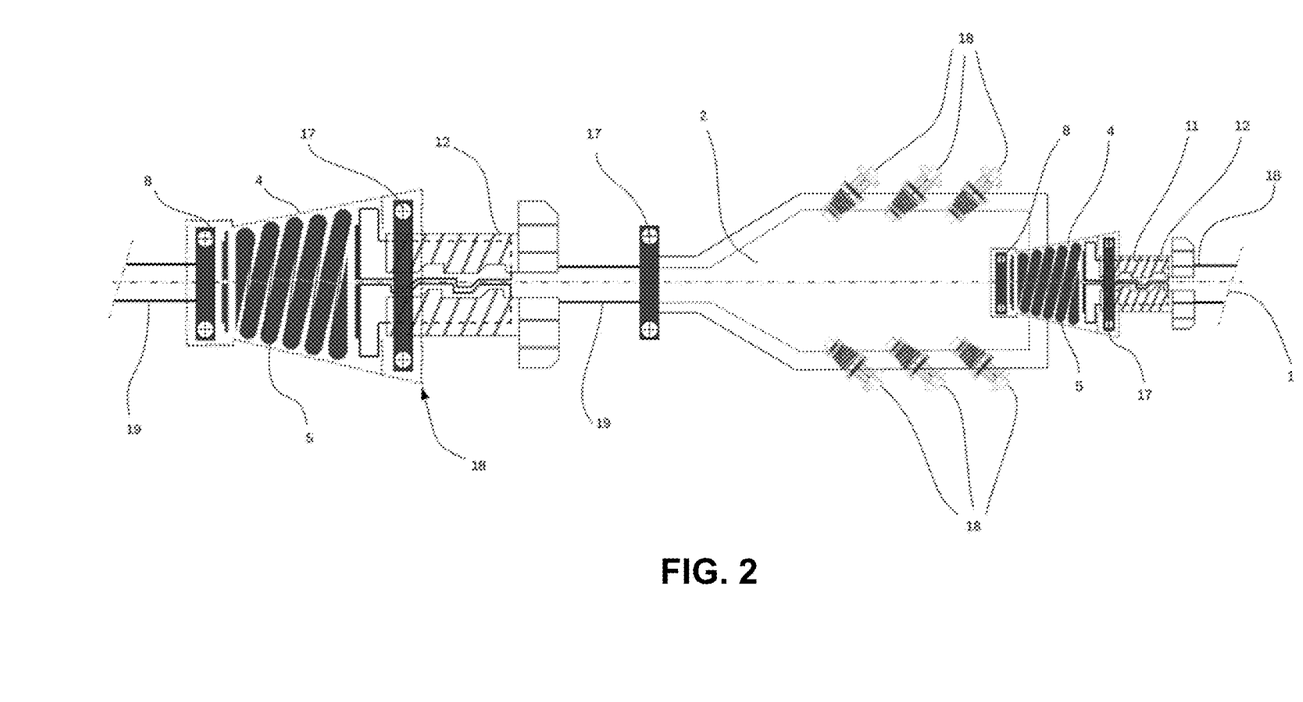
FIG. 2 shows a cross-sectional view of a housing according to an alternative embodiment of the present invention.

FIG. 2 shows a cross-sectional view of a housing according to an alternative embodiment of the present invention.

The housing (2) comprises a free inner space and an elongate cylindrical projection (19) and a plurality of cable entries (18). The cable entries (18) are similar to the cable entry (18) in FIG. 1. In a side wall of the housing (2) opposite the elongate cylindrical projection (19) is a cable entry (18). The housing (2) comprises three further cable entries (18) on a first side wall of the housing (2) between the elongate cylindrical projection (19) and the opposite cable entry (18) and three further cable entries (18) on a second side wall of the housing (2) between the elongate cylindrical projection (19) and the opposite cable entry. Said six further cable entries (18) have a smaller diameter than said opposite cable entry (18). The elongate cylindrical projection (19) is passed through a cable entry (18), similar to the cable entry (18) in FIG. 1, watertight and dust-tight into a second housing. The second housing is not shown in FIG. 2. The housing (2) from FIG. 2 is suitable for the watertight and dust-tight passage of several cables, in this embodiment there are a main cable and six additional cables, through a cable entry.

The invention claimed is:

1. A cable entry for watertight and dust-tight passage of a cable in a housing, comprising a body, the body extending along a longitudinal axis, the body comprising a cavity, a first and a second opening for passage of the cable, wherein the first and the second openings are positioned on the longitudinal axis of the body on opposite sides of the cavity, a sealing element, the sealing element being received in the cavity of the body, the sealing element comprising a single body spirally-wrapped around the cable to form a cylindrical channel for passage of the cable oriented along the longitudinal axis, and a clamping element on the side of the second opening for clamping the sealing element in the cavity of the body, wherein the body and the clamping element each comprise two detachable halves, a first half being located on a first side and a second half on a second side of a plane, the longitudinal axis of the body being located in the plane, and in that the sealing element is spiral shaped.

2. The cable entry according to claim 1, wherein the cavity and the sealing element are conical after wrapping around the cable, the cavity and the sealing element having an equal apex angle and the apex angle of the cavity is positioned on the side of the first opening.

3. The cable entry according to claim 1, wherein the body comprises a strain relief on the side of the first opening.

4. The cable entry according to claim 1, wherein a washer is placed in the cavity of the body near the first opening, the washer comprising two detachable halves, a first half being located on a first side and a second half on a second side of a plane, the longitudinal axis of the body being located in the plane.

5. The cable entry according to claim 1, wherein the clamping element is a hollow bolt, the hollow bolt extending along a longitudinal axis and the hollow bolt comprising a channel for passage of the cable along the longitudinal axis.

6. The cable entry according to claim 5, wherein the cable entry comprises on the side of the second opening symmetrically about the longitudinal axis of the body a cylindrical threaded inner wall configured to receive the hollow bolt.

7. The cable entry according to claim 5, wherein a hollow cylindrical pressing means is arranged inside the hollow bolt, the cylindrical pressing means comprising an annular pressure surface on the side of the second opening and the cylindrical pressing means comprising two detachable halves, a first half on a first side and a second half being located on a second side of a plane, the longitudinal axis of the body being located in the plane.

8. A housing with cable entry for watertight and dust-tight passage of at least one cable, comprising at least one cable entry and a box, wherein each cable entry is according to claim 1, and in that the box comprises two detachable halves, a first half of the body of each cable entry being integrated in a first half of the box and a second half of the body of the cable entry is clamped against the first half of the cable entry by a second half of the box.

9. The housing according to claim 8, wherein the first half of the box comprises a base plate, the base plate extending on a side wall of the box with a cable entry beyond the side wall and the base plate comprising a strain relief outside the box and in the longitudinal direction of cable entries on said side wall.

10. The housing according to claim 8, wherein the housing comprises at least two cable entries, the box comprising an elongate cylindrical projection on a side wall, the elongate cylindrical projection comprising a cylindrical channel for cable passage, wherein the elongate cylindrical projection comprises two detachable halves, wherein a first half of the elongate cylindrical projection is part of the first half of the box and wherein a second half of the elongate cylindrical projection is part of the second half of the box.

11. Use of a housing with cable entry for watertight and dust-tight passage of at least one cable, comprising at least one cable entry and a box, wherein each cable entry is according to claim 1, and in that the box comprises two detachable halves, a first half of the body of each cable entry being integrated in a first half of the box and a second half of the body of the cable entry is clamped against the first half of the cable entry by a second half of the box;

for placing junction boxes in telecom or energy systems.

12. A method for passing a cable through a watertight and dust-tight cable entry, comprising:

feeding a cable into a cylindrical channel in a sealing element of the cable entry;

receiving the sealing element in a cavity of a body of the cable entry, the body extending along a longitudinal axis, the cable being passed through a first and a second opening of the body, and wherein the first and second openings are positioned on the longitudinal axis of the body on opposite sides of the cavity;

clamping the sealing element in the cavity of the body using a clamping element;

wherein the sealing element is spirally wound around the cable, in that the body is opened into two halves for receiving the sealing element, after which the two halves are closed around the sealing element and in that the clamping element is opened into two halves for clamping the sealing element, after which the two halves are closed around the cable and the clamping element is fixed in or on the cable entry.

13. The method according to claim 12, wherein the clamping element is a hollow bolt, wherein the hollow bolt is tightened in the cable entry and wherein the hollow bolt compresses the sealing element during tightening.

14. The method according to claim 12, wherein the method comprises the additional step of screwing in a strain relief, comprised in the body of the cable entry.

15. The method according to claim 12, wherein the cable is not cut when being passed through the cable entry.

16. Use of a method according to claim 12 for placing junction boxes in telecom or energy systems.

\* \* \* \* \*